(12) United States Patent
Wang

(10) Patent No.: US 6,988,512 B1
(45) Date of Patent: Jan. 24, 2006

(54) VALVES STEM STRUCTURE OF FLUID CONTROL VALVE

(76) Inventor: Hsiang-Shih Wang, P.O. Box 453, Taichung (TW)

( * ) Notice: Subject to any disclaimer, the term of this patent is extended or adjusted under 35 U.S.C. 154(b) by 307 days.

(21) Appl. No.: 10/674,533

(22) Filed: Oct. 1, 2003

(51) Int. Cl.
*F16K 11/10* (2006.01)

(52) U.S. Cl. .................................. 137/625.47; 137/887

(58) Field of Classification Search .......... 137/625.47, 137/887
See application file for complete search history.

(56) References Cited

U.S. PATENT DOCUMENTS

| | | | |
|---|---|---|---|
| 1,491,115 A * | 4/1924 | Taylor | 417/186 |
| 2,850,041 A * | 9/1958 | Radanof | 137/625.41 |
| 5,681,028 A * | 10/1997 | Cook et al. | 251/170 |
| 5,871,032 A * | 2/1999 | Ko | 137/625.47 |

* cited by examiner

Primary Examiner—John Fox
(74) Attorney, Agent, or Firm—Alan D. Kamrath; Nikolai & Mersereau, P.A.

(57) ABSTRACT

A fluid control valve comprises a valve body, and a valve stem structure located in the valve body. The valve body is provided with an inlet, a side vent, and a bottom vent. The inlet is in communication with the side vent via a through hole of an admission block, one distribution hole of a distribution block, and one discharge hole of a housing of the valve stem structure. The admission block is provided with an indentation enabling the inlet to be in communication with the bottom vent of the valve body via the through hole of the admission block, other distribution hole of the distribution block, other discharge hole of the housing, and a gap formed between a bottom section of the housing and a bottom of the valve body.

1 Claim, 4 Drawing Sheets

VALVES STEM STRUCTURE OF FLUID CONTROL VALVE

BACKGROUND OF THE INVENTION

1. Field of the Invention

The present invention relates generally to a fluid control valve, and more particularly to a valve stem structure of the fluid control valve.

2. Description of Related Art

The conventional faucet comprises a valve body and a valve stem which is located in a cell of the interior of the valve body. The cell of the valve body is generally provided with a vent. However, the cell of the valve body of certain faucets is provided with two vents. Under such circumstances, the conventional valve stem is no longer useful. As a result, a new valve stem structure must be designed to adapt to such faucets.

SUMMARY OF THE INVENTION

The primary objective of the present invention is to provide a valve stem structure adaptable to a fluid control valve having two vents.

The valve stem structure of the present invention comprises a housing, a spindle, a retaining piece, an urging block, a distribution block, and an admission block. The spindle is extended from one end of the housing in which the retaining piece, the urging block, the distribution block, and the admission block are disposed in that order. The distribution block is provided with two fluid distribution holes. The admission block is provided with a through hole corresponding in location to the fluid distribution holes of the distribution block and an inlet of the valve body of the fluid control valve. The admission block is further provided with an indentation enabling the fluid to be discharged via a second vent of the valve body.

The feature and the advantage of the present invention will be more readily understood upon a thoughtful deliberation of the following detailed description of the present invention with reference to the accompanying drawings.

DETAILED DESCRIPTION OF THE INVENTION

Figure 1:
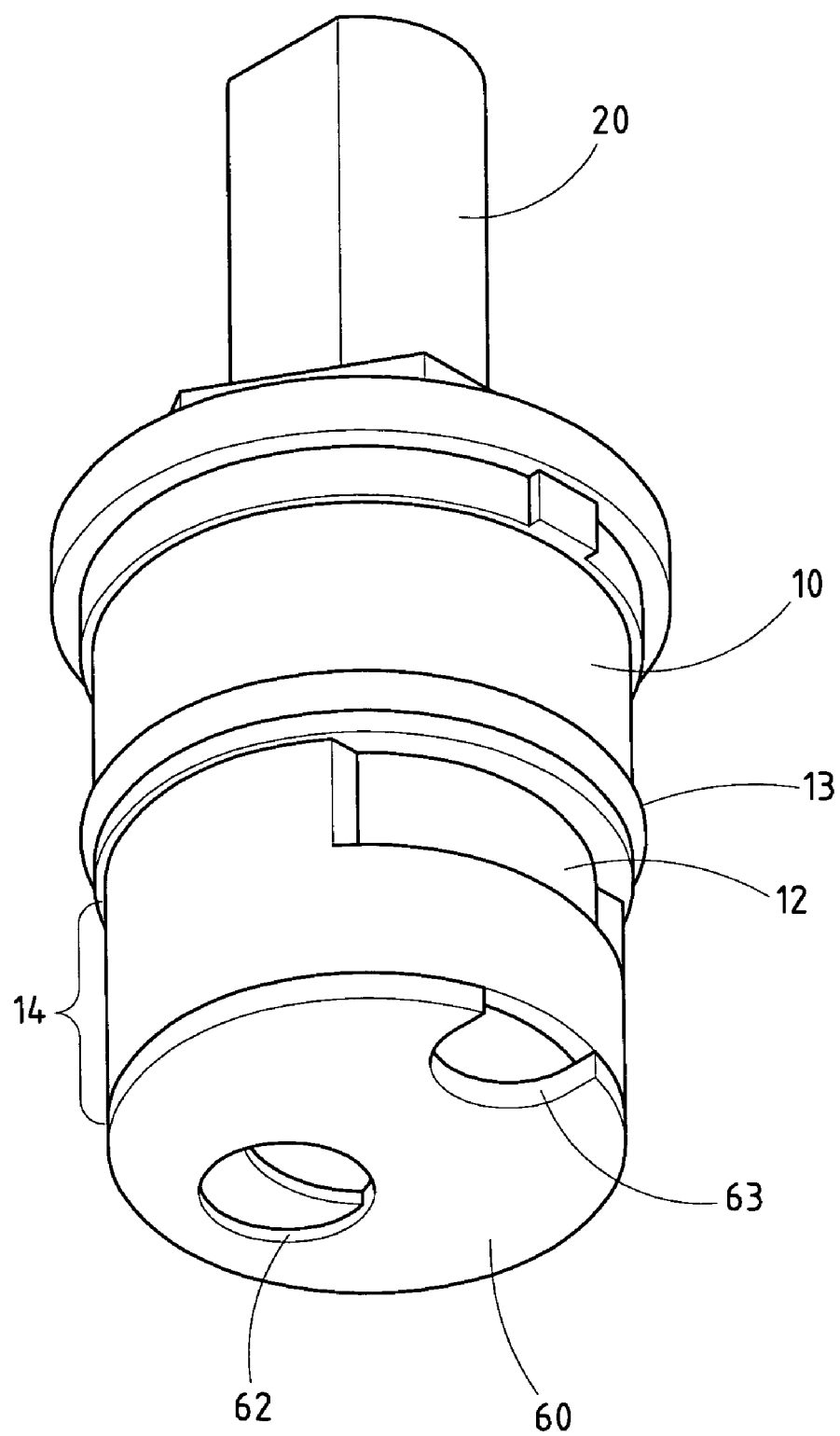
FIG. 1 shows a perspective view of a valve stem structure of the present invention.
Figure 2:
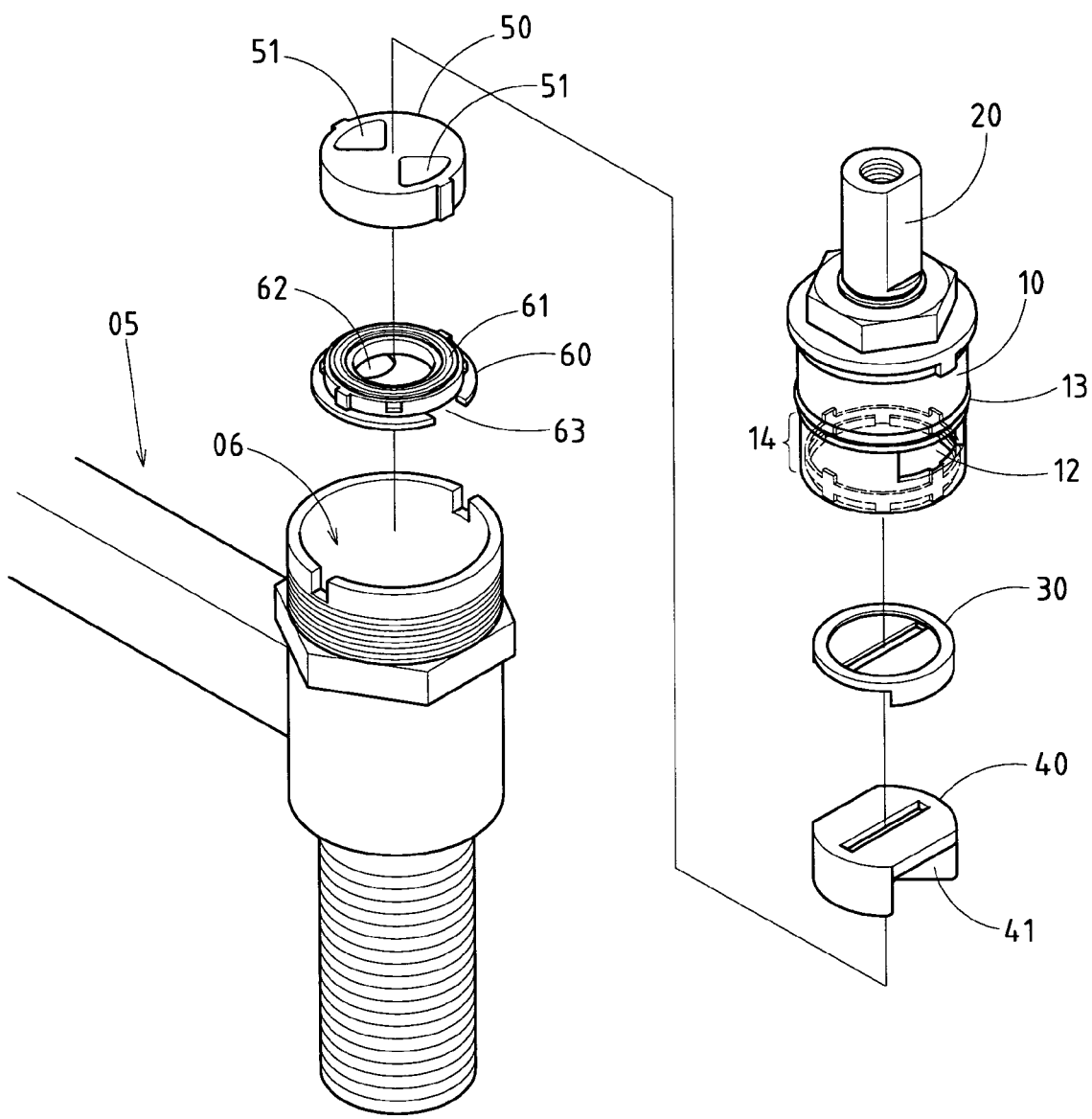
FIG. 2 shows an exploded view of the valve stem structure of the present invention.

As shown in FIGS. 1–4, a fluid control valve 05 of the present invention comprises a valve body 06 and a valve stem structure comprising a housing 10, a spindle 20, a retaining piece 30, an urging block 40, a distribution block 50, and an admission block 60.

Figure 3:
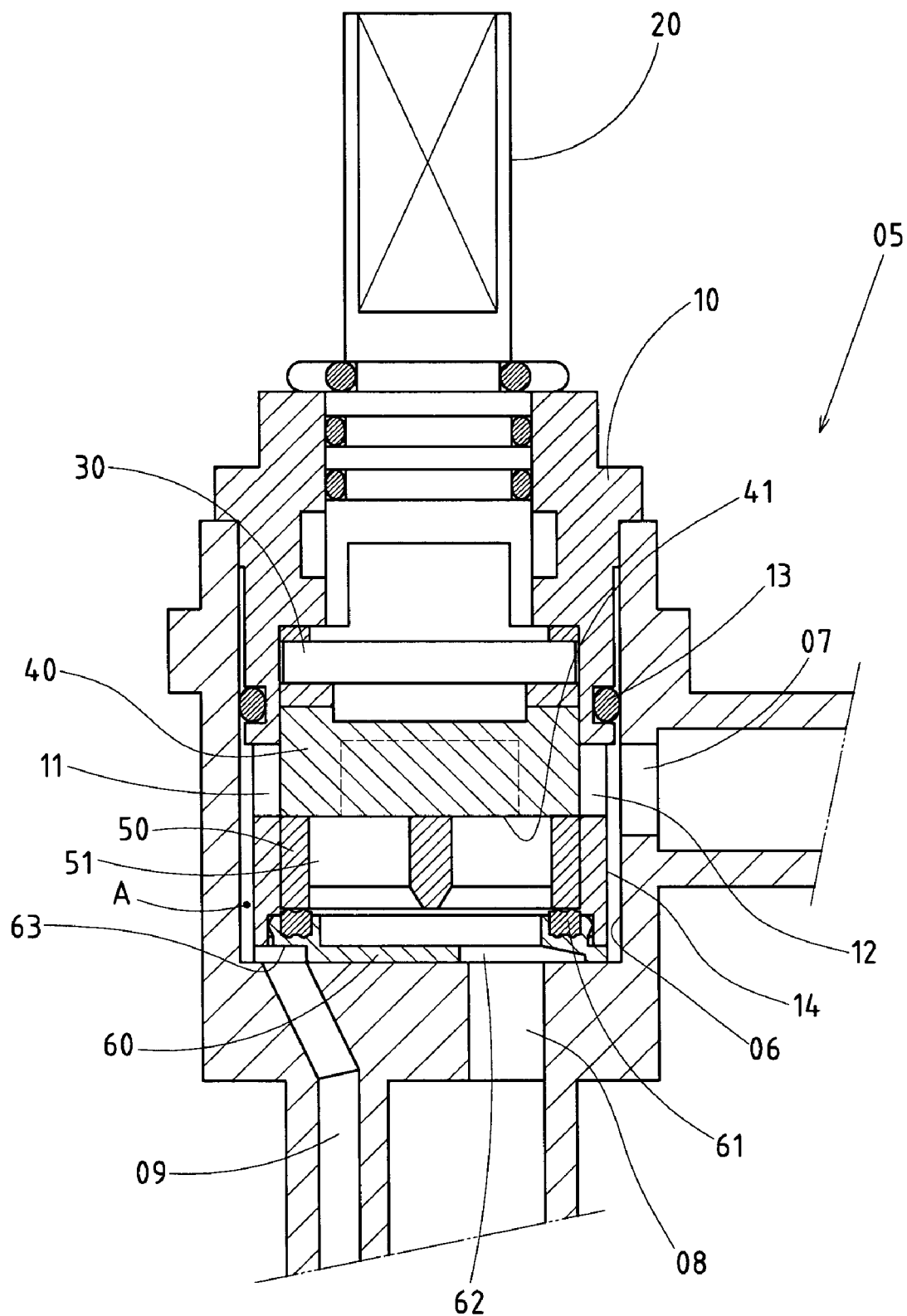
FIG. 3 shows a longitudinal sectional view of a fluid control valve of the present invention.
Figure 4:
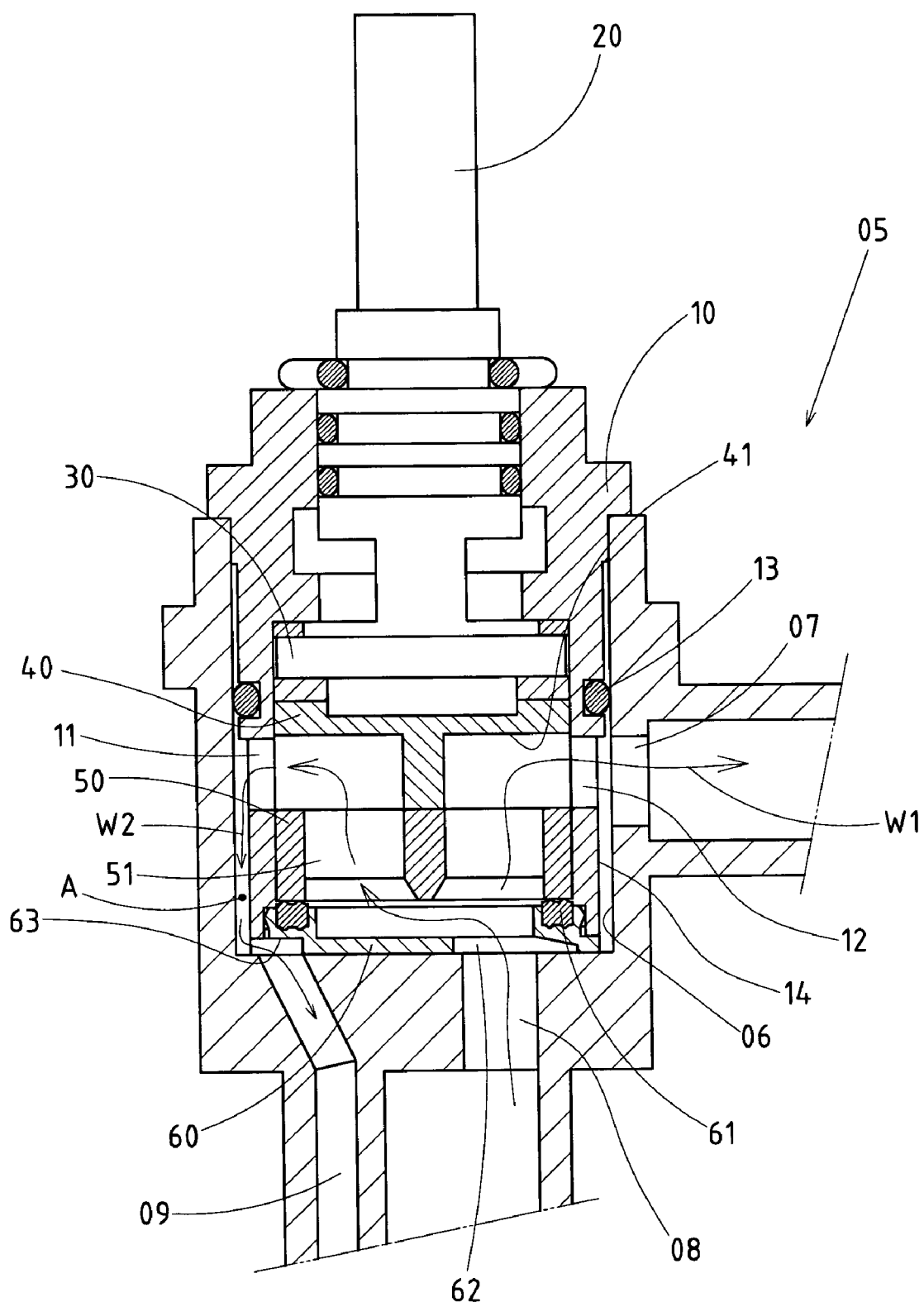
FIG. 4 shows a longitudinal sectional view of the fluid control valve of the present invention at work.

The valve body 06 is provided with a side vent 07, an inlet 08, and a bottom vent 09, as shown in FIGS. 3 and 4.

The housing 10 is provided in the side wall with two discharge holes 11 and 12, and in the outer wall with a washer 13. The housing 10 is fitted into the valve body 06 such that the second discharge hole 12 of the housing 10 is corresponding to the side vent 07 of the valve body 06, and that the washer 13 comes in contact with an inner wall of the valve body 06, and further that a bottom section 14 of the housing 10 and a bottom of the valve body 06 form a gap "A". The bottom section 14 is located below the side vent 07 of the valve body 06, whereas the washer 13 is located above the side vent 07 of the valve body 06.

The spindle 20 is extended from a closed end of the housing 10. The housing 10 has an open end through which the retaining piece 30 is disposed in the housing 10 in such a way that a bottom end of the spindle 20 is retained by the retaining piece 30. The urging block 40 is disposed in the housing 10 such that the urging block 40 is retained by the retaining piece 30. The urging block 40 is provided in an underside with a fluid control slot 41. The distribution block 50 is disposed in the housing 10 such that the distribution block 50 comes in contact with the underside of the urging block 40. The distribution block 50 is provided with two fluid distribution holes 51. The admission block 60 is disposed in the open end of the housing 10 such that a washer 61 of the top of the admission block 60 is in an intimate contact with the distribution block 50. The admission block 60 is provided with a through hole 62 corresponding in location to the fluid distribution holes 51 of the distribution block 50 and the inlet 08 of the bottom of the valve body 06.

The present invention is characterized by the admission block 60 which is further provided with an indentation 63. The indentation 63 serves to enable the bottom of the valve body 06 to be in communication with the gap "A" which is formed between the bottom section 14 of the housing 10 and the valve body 06.

As illustrated in FIG. 4, a fluid is admitted into the valve body 06 via the inlet 08 of the valve body 06 such that one fluid flow "W1" is discharged by the side vent 07 of the valve body 06 via the through hole 62 of the admission block 60, one of the fluid distribution holes 51 of the distribution block 50, and the second discharge hole 12 of the housing 10. In the meantime, other fluid flow "W2" is discharged by the bottom vent 09 of the valve body 06 via the through hole 62 of the admission block 60, other fluid distribution hole 51 of the distribution block 50, the first discharge hole 11 of the housing 10, and the gap "A".

I claim:

1. A fluid control valve comprising:
   a valve body provided with a side vent, a bottom vent, and an inlet; and
   a valve stem structure comprising a housing, a retaining piece disposed in said housing such that said retaining piece is fastened with the bottom end of a spindle extending out from one end of said housing, an urging block disposed in said housing such that said urging block is retained by said retaining piece, a distribution block disposed in said housing such that said distribution block comes in contact with said urging block, and an admission block disposed in said housing such that said admission block is in an intimate contact with said distribution block whereby said valve stem structure is located in said valve body such that a gap is formed between a bottom section of said housing and a bottom of said valve body, and that said inlet of said valve body is in communication with said side vent of said valve body via a through hole of said admission block, one distribution hole of said distribution block, and one discharge hole of said housing;
   wherein said admission block is provided with an indentation serving to enable said inlet of said valve body to be in communication with said bottom vent of said valve body via said through hole of said admission block, other distribution hole of said distribution block, other discharge hole of said housing, and the gap formed between the bottom section of said housing and the bottom of said valve body.

* * * * *